US009697966B2

(12) United States Patent
Iwamoto

(10) Patent No.: US 9,697,966 B2
(45) Date of Patent: Jul. 4, 2017

(54) OPERATING DEVICE

(71) Applicant: DENSO CORPORATION, Kariya, Aichi-pref. (JP)

(72) Inventor: Takanobu Iwamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/766,273

(22) PCT Filed: Feb. 4, 2014

(86) PCT No.: PCT/JP2014/000575
§ 371 (c)(1),
(2) Date: Aug. 6, 2015

(87) PCT Pub. No.: WO2014/122921
PCT Pub. Date: Aug. 14, 2014

(65) Prior Publication Data
US 2015/0380186 A1 Dec. 31, 2015

(30) Foreign Application Priority Data
Feb. 8, 2013 (JP) .................. 2013-023593
Sep. 13, 2013 (JP) .................. 2013-190695

(51) Int. Cl.
*H01H 3/08* (2006.01)
*H01H 19/00* (2006.01)
(Continued)

(52) U.S. Cl.
CPC ............. *H01H 19/14* (2013.01); *B60K 37/02* (2013.01); *B60K 2350/2086* (2013.01);
(Continued)

(58) Field of Classification Search
CPC .......... H01H 3/08; H01H 19/00; H01H 19/14; H01H 21/00; H01H 13/20; H01H 13/50;
(Continued)

(56) References Cited

U.S. PATENT DOCUMENTS 3,965,311 A * 6/1976 Parolin ................ B60Q 1/1492
200/16 C
5,493,089 A * 2/1996 Chasen .................. D06F 75/26
200/523

FOREIGN PATENT DOCUMENTS

JP   S5714015 U   6/1982
JP   H0565022 U   8/1993
(Continued)

OTHER PUBLICATIONS

International Search Report and Written Opinion (in Japanese with English Translation) for PCT/JP2014/000575, mailed Mar. 18, 2014; ISA/JP.
(Continued)

*Primary Examiner* — Edwin A. Leon
*Assistant Examiner* — Anthony R. Jimenez
(74) *Attorney, Agent, or Firm* — Harness, Dickey & Pierce, P.L.C.

(57) ABSTRACT

An operating device includes a knob, which is formed into a rod form, and a resilient body, which is formed into a ring form. Position limiting parts, which limit a position of the resilient body, include at least one primary rib, which is placed on one side of the resilient body in a longitudinal direction of the knob, and at least one secondary rib, which is placed on another side of the resilient body in the longitudinal direction of the knob. The at least one primary rib and the at least one secondary rib radially outwardly project from the outer peripheral portion of the knob within an extent that does not extend beyond the resilient body.

9 Claims, 3 Drawing Sheets

(51) Int. Cl.
 *H01H 19/14* (2006.01)
 *H01H 21/00* (2006.01)
 *B60K 37/02* (2006.01)

(52) U.S. Cl.
 CPC ... *H01H 2221/01* (2013.01); *H01H 2221/062* (2013.01); *H01H 2231/00* (2013.01); *H01H 2231/026* (2013.01)

(58) Field of Classification Search
 CPC .......... H01H 2003/00; H01H 2003/12; H01H 2003/32; H01H 2003/326; H01H 2003/46; H01H 2211/008; H01H 2211/03; H01H 2221/058; H01H 2221/01; H01H 2221/062; H01H 2231/00; H01H 2231/026
 USPC ........................................................ 200/336
 See application file for complete search history.

(56) References Cited

FOREIGN PATENT DOCUMENTS

| | | |
|---|---|---|
| JP | H11344362 A | 12/1999 |
| JP | 2005134227 A | 5/2005 |
| JP | 2011163959 A | 8/2011 |

OTHER PUBLICATIONS

Notice of Submission of Information in Corresponding JP Application No. 2013-190695 dated Jan. 7, 2015.
Office Action in Corresponding JP Application No. 2013-190695 mailed Feb. 10, 2015 (in Japanese with English Translation).

\* cited by examiner

(12) United States Patent

OPERATING DEVICE

CROSS REFERENCE TO RELATED APPLICATIONS

This application is a U.S. National Phase Application under 35 U.S.C. 371 of International Application No. PCT/JP2014/000575 filed on Feb. 4, 2014 and published in Japanese as WO 2014/122921 A1 on Aug. 14, 2014. This application is based on and claims the benefit of priority from Japanese Patent Application No. 2013-023593 filed on Feb. 8, 2013 and Japanese Patent Application No. 2013-190695 filed on Sep. 13, 2013. The entire disclosures of all of the above applications are incorporated herein by reference.

TECHNICAL FIELD

The present disclosure relates to an operating device for performing a display change operation of a display device of a vehicle.

BACKGROUND ART

For instance, an operating device of Patent Literature 1 is known as a prior art operating device. The operating device of Patent Literature 1 is applied to, for example, a vehicle meter and includes: a manipulating knob, which extends from a display device side and is configured into a rod form; a cover, which covers a front side of the display device and has a through-hole for receiving the knob therethrough; a wall portion, which is placed adjacent to the through-hole and projects toward the display device side; a recess, which is configured into a groove form and extends along an entire circumferential extent of an outer peripheral surface of a portion of the knob that corresponds to the wall portion; and a resilient body, which is configured into a ring form and is fitted into the recess configured into the groove form.

In the operating device of Patent Literature 1, even when a distal end portion of the knob is vibrated upon application of vibrations of a vehicle to the knob, the resilient body, which is configured into the ring form, contacts the wall portion. Therefore, it is possible to limit generation of noises, which would be otherwise generated through contact between the knob and the cover.

However, in a case where the vibrations of the vehicle are excessively large, when the resilient body, which is configured into the ring form, is largely deformed (compressed) through the vibrations of the knob, the outer peripheral surface of the knob may directly contact the wall portion to cause generation of the noises. Particularly, when the resilient body is largely compressed, the outer peripheral surface of the knob may possibly contact an entire extent of the wall portion in a projecting direction of the wall portion.

CITATION LIST

Patent Literature

PATENT LITERATURE 1: JP2005-134227A

SUMMARY OF INVENTION

In view of the above disadvantages, it is an objective of the present disclosure to provide an operating device that can more effectively limit generation of a noise that is generated between a knob and a cover due to application of vibrations.

To achieve the above objective, according to the present disclosure, there is provided an operating device that includes a knob, a cover, a wall portion, a resilient body, and position limiting parts. The knob is configured into a rod form and is formed to change a display content on a display device. The cover includes a through-hole, through which the knob extends. The cover is placed on a front side of the display device. The wall portion is configured into a tubular form and extends in a longitudinal direction of the knob from a periphery of the through-hole. The resilient body is configured into a ring form and is installed to an outer peripheral portion of the knob at a location that corresponds to a location of the wall portion. The position limiting parts are formed in the outer peripheral portion and limit a position of the resilient body in the longitudinal direction of the knob. The position limiting parts include at least one primary rib, which is placed on one side of the resilient body in the longitudinal direction of the knob, and at least one secondary rib, which is placed on another side of the resilient body in the longitudinal direction of the knob. The at least one primary rib and the at least one secondary rib radially outwardly project from the outer peripheral portion of the knob within an extent that does not extend beyond the resilient body.

DESCRIPTION OF EMBODIMENTS

Figure 1:
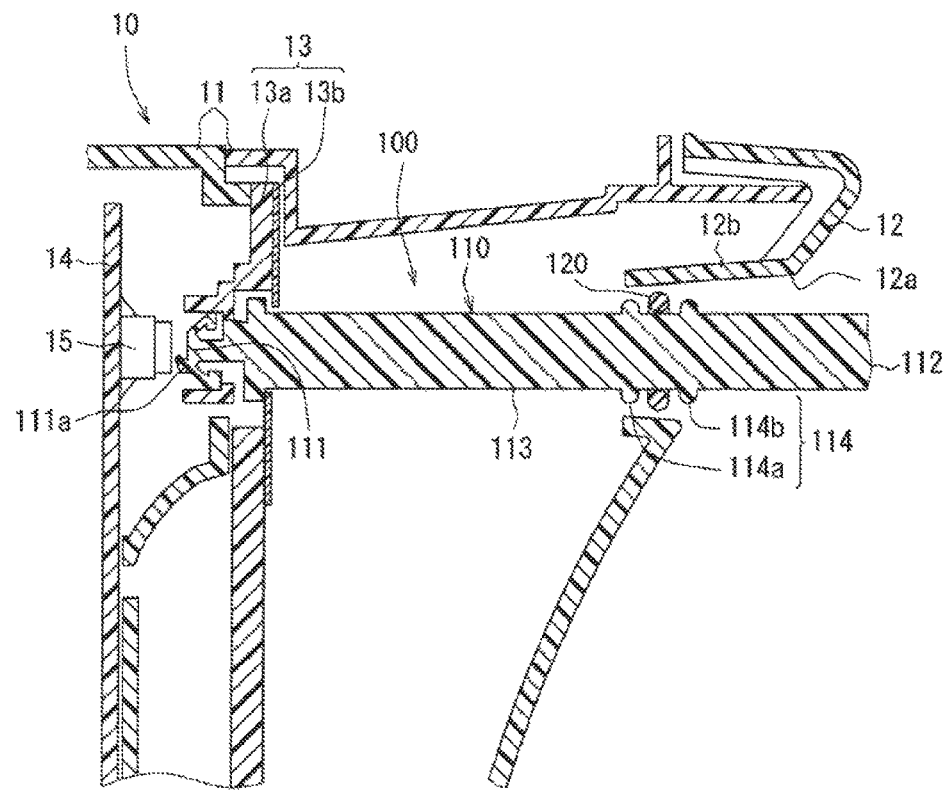
FIG. 1 is a cross-sectional view showing an entire structure of a vehicle combination meter according to a first embodiment of a present disclosure.

Various embodiments of the present disclosure will be described with reference to the accompanying drawings. In the following respective embodiments, portions, which are described in a previous embodiment(s), will be indicated by the same reference numerals and will not be redundantly described in some cases. In each of the following embodiments, if only a part of a structure is described, the remaining part of the structure is the same as that of the previously described embodiment(s). Any one or more components of any one of the following embodiments may be combined with the components of the other one of the following embodiments as long as there is no problem with respect to such a combination even if such a combination is not explicitly discussed in the present specification.

First Embodiment

An operating device 100 according to a first embodiment of the present disclosure will be described with reference to FIGS. 1 to 3. The operating device 100 of the first embodiment is applied to, for example, a vehicle combination meter 10. The operating device 100 is an apparatus that changes a display state at a display device 13 through, for example, a push operation of a knob 110 performed by a user.

Figure 2A:
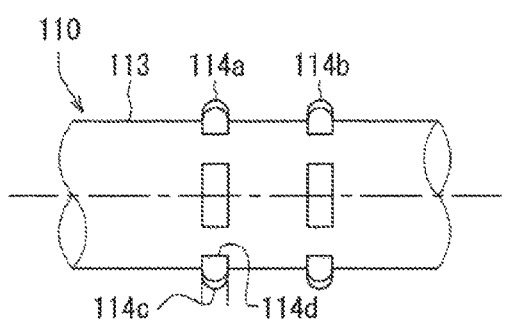
FIG. 2(a) is a partial side view of a knob according to the first embodiment.

As shown in FIG. 1, the vehicle combination meter 10 is formed in such a manner that the display device 13 and a printed circuit board 14 are received in a case that is formed with a case main body 11, which is made of resin and is formed into a bottomed box body placed at a further side away from the user, and a cover 12, which is made of transparent resin and is placed at a closer side relative to the user, and the knob 110 extends through the cover 12 and the display device 13.

The cover 12 is a transparent plate cover that is fixed to the case main body 11 to cover the display device 13. The cover 12 includes a through-hole 12a and a wall portion 12b. The through-hole 12a is a hole, through which the knob 110 is received. Furthermore, the wall portion 12b is formed as a tubular wall that extends from a periphery of the through-hole 12a in a longitudinal direction of the knob 110.

The wall portion 12b is a wall that extends from the through-hole 12a toward the display device 13. The wall portion 12b needs to have a draft angle at a resin molding die of the cover 12. Therefore, an inner diameter of the wall portion 12b is slightly reduced toward a distal end side that extends away from the through-hole 12a.

The display device 13 is formed as follows. In the display device 13, for example, a vehicle speed meter, an engine speed meter, a coolant temperature gauge, a fuel gauge, and an information indicator for indicating various operational states of the vehicle, all of which are not shown in the drawings, are formed in a display plate that is formed with a display plate portion 13a and a display design portion 13b. The vehicle speed meter, the engine speed meter, the coolant temperature gauge, and the fuel gauge are instruments of, for example, a pointer type and are illuminated by, for example, a light-emitting device, such as an LED (not shown) that is installed on the printed circuit board 14, at the night or the like. Furthermore, the information indicator is formed by, for example, a liquid crystal display and can display, for example, a distance traveled, a distance-to-empty, an instant fuel consumption, an average fuel consumption, an outside temperature, and a time, as operational state information through use of characters, numbers or the like.

The printed circuit board 14 is formed as a plate member, to which the pointers of the above-described instruments, and various control parts for controlling the display state of the information indicator are fixed. The various control parts are interconnected to form an electronic circuit. Furthermore, a push switch 15 is formed in a surface (hereinafter referred to as a front surface) of the printed circuit board 14, which is located on the user side. The push switch 15 is placed into an on-state through a push operation of the knob 110. Furthermore, a pair of rotatable switches (not shown) is formed in an opposite surface (hereinafter referred to as a back surface) of the printed circuit board 14, which is opposite from the user side. The rotatable switches are placed into an on-state through a rotational operation of the knob 110.

The push switch 15 is a switch that sequentially changes the operational state information displayed at the information indicator when the switch is placed into the on-state. Therefore, the knob 110 is formed to change the display content at the display device 13 through the push switch 15. For instance, every time the push switch 15 is pushed through the knob 110, the operational state information is changed in the order of, for example, the distance traveled, the distance-to-empty, the instant fuel consumption, the average fuel consumption, the outside temperature, the time, and the distance traveled. The push switch 15 is placed on the front surface of the printed circuit board 14 at a location, at which the push switch 15 is opposed to a resilient part 111a that is formed in a distal end portion 111 of the knob 110.

The rotatable switches form switches, each of which adjusts the brightness of the various instruments and the information indicator at the display device 13 when the switch is placed into the on-state. When one of the pair of rotatable switches is placed into the on-state, the brightness of the display device 13 is increased. In contrast, when the other one of the pair of rotatable switches is placed into the on-state, the brightness of the display device 13 is decreased.

The knob 110, which extends through the through-hole 12a and the wall portion 12b of the cover 12, and an O-ring 120, which is installed to the knob 110, are installed in the operating device 100.

Figure 2B:
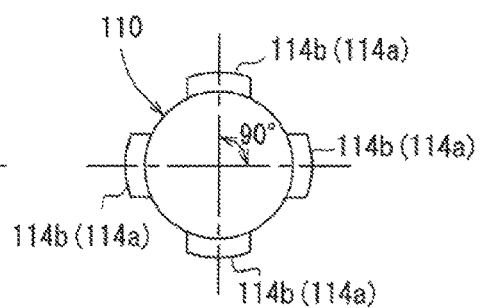
FIG. 2(b) is a front view of the knob of FIG. 2(a).
Figure 3:
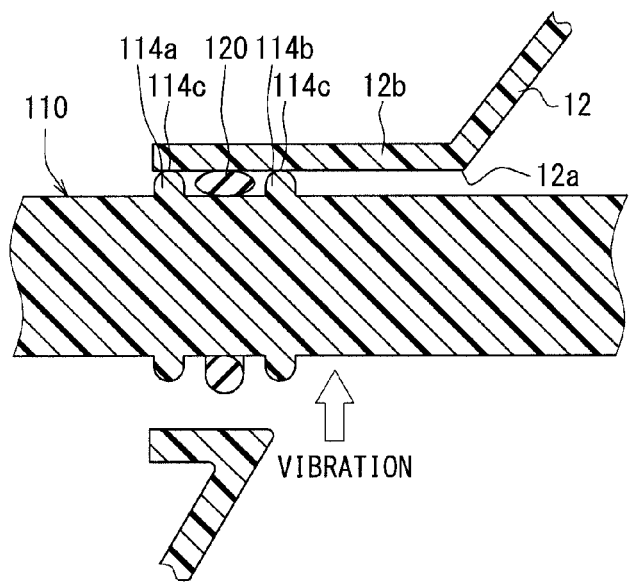
FIG. 3 is a cross-sectional view indicating ribs and an O-ring in a state where the knob is vibrated according to the first embodiment.

As shown in FIGS. 1 to 2(b), the knob 110 is an elongated rod member made of resin. One longitudinal end portion of the knob 110 is the distal end portion 111, and the other longitudinal end portion of the knob 110 is an operatable portion 112. The resilient part 111a is formed in the distal end portion 111 of the knob 110, and a plurality of ribs 114 is formed in an outer peripheral portion 113 of the knob 110. In the present embodiment, the ribs 114 are seamlessly and integrally resin molded with the knob 110.

The resilient part 111a is formed integrally with the knob 110 and is placed between the distal end portion 111 and the push switch 15. In a non-operating state of the knob 110, the position of the knob 110 is limited in a direction toward the user while a predetermined slide gap is formed by the resilient part 111a between the distal end portion 111 and the push switch 15. Then, when the operatable portion 112 is pushed by the user, the resilient part 111a is resiliently deformed, so that the distal end portion 111 contacts the push switch 15, and thereby the push switch 15 is placed into the on-state. Furthermore, when the operatable portion 112, which is placed into the pushed state, is released, the knob 110 (the distal end portion 111) returns to an original position where the position of the knob 110 (the distal end portion 111) is limited by the resilient part 111a.

The ribs 114 serve as position limiting parts that limit the position of the knob 110 in the longitudinal direction of the knob 110 relative to the O-ring 120. The ribs 114 are formed to outwardly project from the outer peripheral portion 113 of the knob 110 in a radial direction of the knob 110 at a location that corresponds to the wall portion 12b (a location, at which the ribs 114 are contactable with the wall portion 12b in the radial direction). The amount of projection of the respective ribs 114 in the radial direction of the knob 110 is set within an extent that does not extend beyond a diameter of a cross section of the O-ring 120. Here, the amount of projection of the respective ribs 114 is set to be about one half of the diameter (a diameter in a natural state) of the cross section of the O-ring 120.

The ribs 114 are formed to at two opposite sides of the O-ring 120 in the longitudinal direction of the knob 110 to hold the O-ring 120 therebetween and include a plurality of primary ribs 114a and a plurality of secondary ribs 114b. The primary ribs 114a are placed on one side (the left side in FIG. 1) of the O-ring 120 in the longitudinal direction of the knob 110, and the secondary ribs 114b are placed on the other side (the right side in FIG. 1) of the O-ring 120 in the longitudinal direction of the knob 110. The primary ribs 114a correspond to ribs located on the one side in the present disclosure, and the secondary ribs 114b correspond to ribs located on the other side in the present disclosure. An axial region of the outer peripheral portion 113 of the knob 110 between the primary ribs 114a and the secondary ribs 114b is a smooth cylindrical surface, and the O-ring 120 is installed to this cylindrical surface.

Each rib 114a, 114b has an identical shape to form a pair with another one of the ribs 114a, 114b, and the corresponding ones of the ribs 114a, 114b are arranged one after another in the circumferential direction of the knob 110. The corresponding ribs 114a, 114b are intermittently formed in the circumferential direction of the knob 110. As shown in FIG. 2(b), for instance, each of the corresponding ribs 114a, 114b has a predetermined length in the circumferential direction of the knob 110, and the corresponding ribs 114a, 114b are arranged one after another at generally equal intervals in the circumferential direction of the knob 110. In this instance, the number of the corresponding ribs 114a, 114b, which are intermittently arranged one after another in the circumferential direction of the knob 110, is four, and these four ribs 114a, 114b are arranged one after another at generally 90 degree intervals. In other words, the primary ribs 114a are arranged one after another at generally equal intervals (generally 90 degree intervals) in the circumferential direction, and the secondary ribs 114b are arranged one after another at generally equal intervals (generally 90 degree intervals) in the circumferential direction. The circumferential positions of the primary ribs 114a are generally the same as the circumferential positions of the secondary ribs 114b, respectively. Therefore, as shown in FIG. 2(b), when the knob 110 is viewed in the axial direction of the knob 110, each of the primary ribs 114a is substantially completely overlapped with a corresponding one of the secondary ribs 114b.

Furthermore, in a cross section (FIG. 1) of each rib 114a, 114b taken along the longitudinal direction of the knob 110, when a size of each rib 114a, 114b measured in the longitudinal direction of the knob 110, is defined as a width size (see FIG. 2(a)) of the rib 114a, 114b, a width size of a distal end portion (a radial distal end portion) 114c of the rib 114a, 114b is set to be smaller than a width size of a proximal end portion (a radial base end portion) 114d of the rib 114a, 114b. In the present embodiment, the configuration of the cross section of each rib 114a, 114b is set such that the cross section of the rib 114a, 114b at the proximal end portion 114d has a predetermined width and becomes an arcuate form toward the distal end portion 114c.

The O-ring 120 is a resilient body, which is configured into a ring form and is made of, for example, a rubber material (elastomer). The O-ring 120 is installed at the outer peripheral portion 113 of the knob 110, which is located between the primary ribs 114a and the secondary ribs 114b. The diameter of the cross section of the O-ring 120 is set to be larger than a projecting size of the each rib 114a, 114b, so that a radially outer side of the O-ring 120 outwardly projects from the distal end portion 114c of each rib 114a, 114b.

An outer diameter of the O-ring 120, which is installed to the knob 110, is set to be slightly smaller than an inner diameter of the through-hole 12a and an inner diameter of the wall portion 12b. That is, a small gap is formed between a radially outer part of the O-ring 120 and radially inner parts of the through-hole 12a and of the wall portion 12b. An inner diameter of the O-ring 120 is set to be slightly larger than the outer diameter of the knob 110, so that the O-ring 120 is rotatably installed to the knob 110.

Next, the operation of the operating device 100, which is formed in the above-described manner, will be briefly described.

In the operating device 100, when the user performs the push operation of the knob 110, the distal end portion 111 of the knob 110 contacts the push switch 15, so that the push switch 15 is placed into the on-state, and thereby the operational state information at the information indicator is changed. When the push operation of the knob 110 is repeated, the operational state information (e.g., the distance traveled, the distance-to-empty, the instant fuel consumption, the average fuel consumption, the outside temperature, the time) is sequentially changed. Thereby, the user can see the desired operational state information, which the user desires to see.

Furthermore, when the user performs the rotational operation of the knob 110 in the state where the display device 13 is illuminated with the light-emitting device, corresponding one of the pair of rotatable switches is placed into the on-state through the rotation of the knob 110. Therefore, the brightness of the display device 13 (the vehicle speed meter, the engine speed meter, the coolant temperature gauge, the fuel gauge, and the information indicator) is changed. For example, when the knob 110 is rotated toward one side, one of the pair of rotatable switches is turned on, so that the brightness of the display device 13 is increased. In contrast, when the knob 110 is rotated toward the other side, the other one of the pair of rotatable switches is turned on, so that the brightness of the display device 13 is decreased.

At this time, the smooth rotational operation of the knob 110 can be achieved due to the presence of the minute gap between the radially outer part of the O-ring 120 and the radially inner parts of the through-hole 12a and of the wall portion 12b, and also due to the installation of the O-ring 120 to the knob 110 in the rotatable manner.

The vibrations are generated in the top-to-bottom direction, the front-to-back direction, and the right-to-left direction during the driving time of the vehicle. When the knob 110 is vibrated by these vibrations, the radially outer side of the O-ring 120 abuts against, for example, the wall portion 12b, as shown in FIG. 3. In the present embodiment, the ribs 114 (the respective ribs 114, 114b) are formed as the position limiting parts, which limit the position of the O-ring 120. Furthermore, the ribs 114 (the respective ribs 114, 114b) are arranged such that the ribs 114 are formed at the two opposite sides of the O-ring 120 in the longitudinal direction of the knob 110 to hold the O-ring 120 therebetween and radially project from the outer peripheral portion 113 of the knob 110 within the extent that does not extend beyond the O-ring 120. Furthermore, the ribs 114 are formed in the circumferential direction of the knob 110.

In this way, even when the knob 110 is excessively vibrated by the external vibrations to cause large compression of the O-ring 120 (see FIG. 3), it is possible to place the knob 110 in the state where only the distal end portion 114c of the rib(s) 114 contacts the wall portion 12b. Therefore, it is possible to limit occurrence of that the entire range of the outer peripheral surface of the knob contacts the wall portion like in Patent Literature 1 discussed in the background art. Thereby, it is possible to reduce a size of the contact surface area between the knob 110 (the ribs 114) and the cover 12 (the wall portion 12b), which are brought to contact with each other by the vibrations. Thus, it is possible to effectively limit generation of the noise by the knob 110 and the cover 12 caused by the vibrations.

Furthermore, the ribs 114 are intermittently formed in the circumferential direction of the knob 110. In this way, even when the knob 110 is excessively vibrated by the external vibrations to cause large compression of the O-ring 120 (see FIG. 3), it is possible to place the knob 110 in the state where only the distal end portion 114c of the rib(s) 114 contacts the wall portion 12b, or only the O-ring 120 is compressed while the ribs 114 do not contact the wall portion 12b at a portion of the knob 110 where the ribs 114 are absent. Thus, in addition to the reduction of the size of the contact surface area between the knob 110 (the ribs 114) and the cover 12 (the wall portion 12b), which contact with each other due to the vibrations, it is possible to reduce the frequency of occurrence of the contact between the knob 110 and the cover 12. Therefore, the generation of the noise at the knob 110 and the cover 12 through the application of the vibrations can be further effectively limited.

Furthermore, the circumferential intervals of the ribs 114, which are intermittently formed one after another in the circumferential direction, are set to be generally equal intervals (e.g., generally 90 degree intervals). Therefore, the position of the O-ring 120, which is configured into the ring form, can be effectively limited along the circumferential direction.

Furthermore, the width size of the distal end portion 114c of the rib 114 is set to be smaller than the width size of the proximal end portion 114d of the rib 114. Therefore, even when the distal end portion 114c of the rib 114 contacts the wall portion 12b due to the excessive vibrations of the knob 110 induced by the application of the external vibrations, it is possible to reduce the size of the contact surface area between the distal end portion 114c of the rib 114 and the wall portion 12b.

Second Embodiment

Figure 4A:
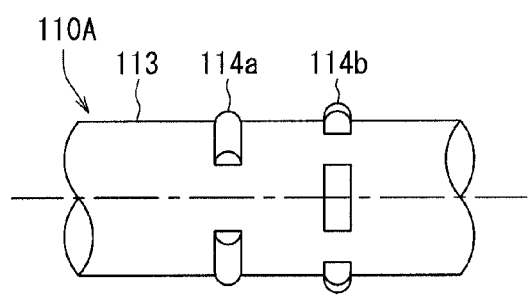
FIG. 4(a) is a partial side view of a knob according to a second embodiment of the present disclosure.
Figure 4B:
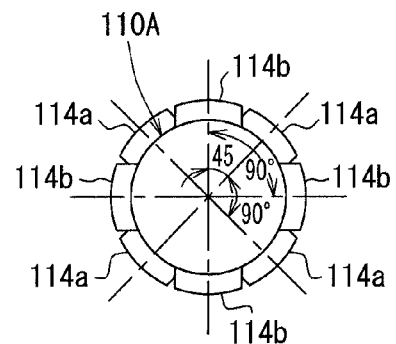
FIG. 4(b) is a front view of the knob of FIG. 4(a).

A knob 110A according to a second embodiment of the present disclosure is shown in FIGS. 4(a) to 4(b). In the second embodiment, unlike the first embodiment, circumferential locations of a plurality of primary ribs 114a, which are intermittently arranged one after another, are different from circumferential locations of a plurality of secondary ribs 114b, which are intermittently arranged one after another.

As shown in FIG. 4(b), the primary ribs 114a are arranged one after another at generally 90 degree intervals starting from a corresponding reference position that is a given circumferential position of the knob 110. In contrast, the secondary ribs 114b are arranged one after another at generally 90 degree intervals starting from a corresponding reference position, which is displaced from the given circumferential position of the knob by 45 degrees. Therefore, as shown in FIG. 4(b), when the knob 110 is viewed in the axial direction of the knob 110, the primary ribs 114a and the secondary ribs 114b are alternately arranged one after another in the circumferential direction.

In this way, when the knob 110 is excessively vibrated due to the applied external vibrations, only one of the primary rib 114a and the secondary rib 114b contacts the wall portion 12b, or none of the primary rib 114a and the secondary rib 114b contacts the wall portion 12b depending on the location of the knob 110. As a result, it is possible to further reduce the size of the contact surface area (the frequency of occurrence of the contact) between the knob 110 (the ribs 114a, the ribs 114b) and the cover 12 (the wall portion 12b), which contact with each other due to the vibrations.

Third Embodiment

Figure 5:
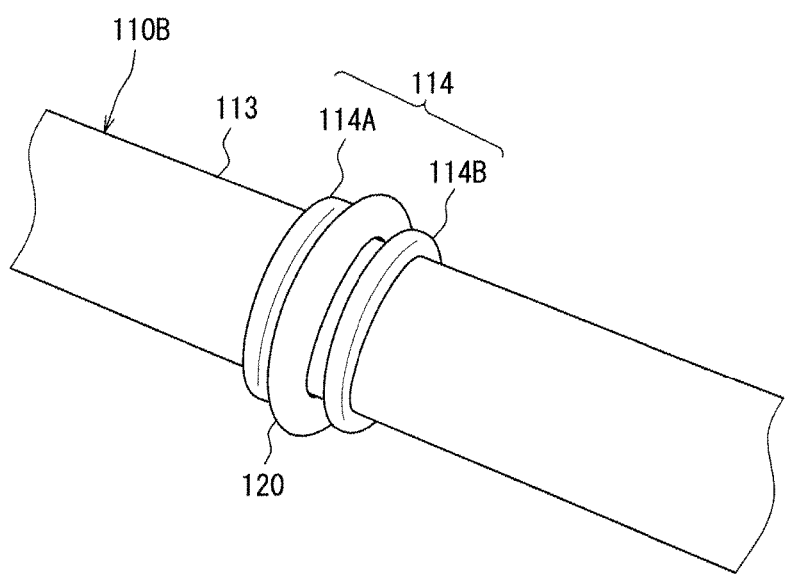
FIG. 5 is a perspective view showing a key feature of a knob according to a third embodiment of the present disclosure.

FIG. 5 shows a knob 110B according to a third embodiment of the present disclosure. In the third embodiment, the primary ribs 114a and the secondary ribs 114b of the first and second embodiments are replaced with a primary rib 114A and a secondary rib 114B, each of which is continuously formed in the circumferential direction along an entire circumferential extent of the outer peripheral portion 113 of the knob 110B. Specifically, only the single primary rib 114A is formed on one side of the O-ring 120 in the longitudinal direction of the knob 110B, and only the single secondary rib 114B is formed on the other side of the O-ring 120 in the longitudinal direction of the knob 110B. A cross section of each rib 114A, 114B, which corresponds to the cross section shown in FIGS. 1 and 3, is uniform along the circumferential direction. Furthermore, the cross section of each rib 114A, 114B is the same as the cross section of each of the ribs 114a, 114b of the first and second embodiments.

In the present embodiment, similar to the first embodiment, even when the knob 110B is excessively vibrated by the external vibrations to cause large compression of the O-ring 120 (see FIG. 3), it is possible to place the knob 110B in the state where only the distal end portion 114c of each rib 114A, 114B contacts the wall portion 12b. Thereby, it is possible to reduce a size of the contact surface area between the knob 110 (each rib 114A, 114B) and the cover 12 (the wall portion 12b), which are brought to contact with each other by the vibrations. Thus, it is possible to effectively limit generation of the noise by the knob 110 and the cover 12 caused by the vibrations.

Furthermore, the ribs 114A, 114B are formed on the one side and the other side, respectively, of the O-ring 120 to hold the O-ring 120 therebetween along the entire circumferential extent of the O-ring 120, so that the position of the O-ring 120 can be reliably limited.

Other Embodiments

In the first and second embodiments, the circumferential intervals of the ribs 114a, 114b are generally equal intervals. Alternatively, the ribs 114, 114b may be arranged one after another at unequal intervals within an extent that does not have an adverse effect on the positioning of the O-ring 120 with the ribs 114a, 114b. Furthermore, the circumferential length of each rib 114a, 114b may be individually differently set.

In each of the above embodiments, the cross section of each rib 114a, 114b, 114A, 114B is configured such that the cross section of the distal end portion 114c has the arcuate form. Alternatively, the cross section of the distal end portion 114c of each rib 114a, 114b, 114A, 114B may be configured into, for example, a triangular form or a quadrangular form.

Furthermore, the width size of the distal end portion 114c of each rib 114a, 114b, 114A, 114B is set to be smaller than the width size of the proximal end portion 114d of each rib 114a, 114b, 114A, 114B. Alternatively, the width size of the distal end portion 114c of each rib 114a, 114b, 114A, 114B may be set to be the same as the width size of the proximal end portion 114d of each rib 114a, 114b, 114A, 114B.

Furthermore, in the above embodiments, the wall portion 12b is formed as the wall that extends from the periphery of the through-hole 12a toward the display device 13 side. Alternatively, the wall portion 12b may be formed as a wall that extends from the periphery of the through-hole 12a toward an opposite side, which is opposite from the display device 13.

Furthermore, the operating device 100 is used to change the operational state information of the information indicator of the vehicle combination meter 10 or to adjust the brightness of the display device 13. Alternatively, the operating device 100 may be used as an operating device that performs an input operation through the push operation and/or the rotational operation of the knob 110 in various types of apparatuses.

What is claimed is:

1. An operating device comprising:
   a knob that is configured into a rod form and is formed to change a display content on a display device;
   a cover that includes a through-hole, through which the knob extends, wherein the cover is placed on a front side of the display device;
   a wall portion that is configured into a tubular form and extends in a longitudinal direction of the knob from a periphery of the through-hole;
   a resilient body that is configured into a ring form and is installed to an outer peripheral portion of the knob at a location that corresponds to a location of the wall portion; and
   position limiting parts that are formed on the outer peripheral portion and limit a position of the resilient body in the longitudinal direction of the knob, wherein:
   the position limiting parts include:
      a plurality of primary ribs, which are placed on one side of the resilient body in the longitudinal direction of the knob and are intermittently arranged one after another in a circumferential direction of the knob; and
      a plurality of secondary ribs, which are placed on another side of the resilient body in the longitudinal direction of the knob and are intermittently arranged one after another in the circumferential direction of the knob;
   the plurality of primary ribs and the plurality of secondary ribs are integrally formed with the knob from resin as a one-piece component and radially outwardly project from the outer peripheral portion of the knob within an extent that does not extend beyond the resilient body in a radial direction; and
   circumferential locations of the plurality of primary ribs are different from circumferential locations of the plurality of secondary ribs.

2. The operating device according to claim 1, wherein:
   circumferential intervals of the plurality of primary ribs are set to be generally equal to each other; and
   circumferential intervals of the plurality of secondary ribs are set to be generally equal to each other.

3. The operating device according to claim 1, wherein the resilient body, which is configured into the ring form and is placed between the plurality of primary ribs and the plurality of secondary ribs in the longitudinal direction of the knob, is rotatable relative to the knob.

4. An operating device comprising:
   a knob that is configured into a rod form and is formed to change a display content on a display device;
   a cover that includes a through-hole, through which the knob extends, wherein the cover is placed on a front side of the display device;
   a wall portion that is configured into a tubular form and extends in a longitudinal direction of the knob from a periphery of the through-hole;
   a resilient body that is configured into a ring form and is installed to an outer peripheral portion of the knob at a location that corresponds to a location of the wall portion; and
   position limiting parts that are formed on the outer peripheral portion and limit a position of the resilient body in the longitudinal direction of the knob, wherein:
   the position limiting parts include at least one primary rib, which is placed on one side of the resilient body in the longitudinal direction of the knob and is formed in a circumferential direction of the knob, and at least one secondary rib, which is placed on another side of the resilient body in the longitudinal direction of the knob and is formed in the circumferential direction of the knob;
   the at least one primary rib and the at least one secondary rib are integrally formed with the knob from resin as a one-piece component and radially outwardly project from the outer peripheral portion of the knob within an extent that does not extend beyond the resilient body in a radial direction;
   a width of a distal end portion of the at least one primary rib, which is measured in the longitudinal direction of the knob, is smaller than a width of a proximal end portion of the at least one primary rib, which is measured in the longitudinal direction of the knob; and
   a width of a distal end portion of the at least one secondary rib, which is measured in the longitudinal direction of the knob, is smaller than a width of a proximal end portion of the at least one secondary rib, which is measured in the longitudinal direction of the knob.

5. The operating device according to claim 4, wherein:
   the at least one primary rib includes only one primary rib, which is formed continuously in the circumferential direction of the knob all around the outer peripheral portion of the knob; and
   the at least one secondary rib includes only one secondary rib, which is formed continuously in the circumferential direction of the knob all around the outer peripheral portion of the knob.

6. The operating device according to claim 4, wherein the resilient body, which is configured into the ring form and is placed between the at least one primary rib and the at least one secondary rib in the longitudinal direction of the knob, is rotatable relative to the knob.

7. The operating device according to claim 4, wherein:
   the at least one primary rib includes a plurality of primary ribs, which are intermittently arranged one after another in the circumferential direction of the knob; and
   the at least one secondary rib includes a plurality of secondary ribs which are intermittently arranged one after another in the circumferential direction of the knob.

8. The operating device according to claim 7, wherein:
   circumferential intervals of the plurality of primary ribs are set to be generally equal to each other; and
   circumferential intervals of the plurality of secondary ribs are set to be generally equal to each other.

9. The operating device according to claim 7, wherein circumferential locations of the plurality of primary ribs are different from circumferential locations of the plurality of secondary ribs.

* * * * *